United States Patent [19]

Hagedorn

[11] 3,943,305

[45] Mar. 9, 1976

[54] TELEPHONE LINE CONTROL SYSTEM

[75] Inventor: Guenter E. W. Hagedorn, Minneapolis, Minn.

[73] Assignee: Magnetic Controls Company, Minneapolis, Minn.

[22] Filed: Nov. 11, 1974

[21] Appl. No.: 522,417

[52] U.S. Cl..... 179/175.3 R; 340/146.1 C; 340/163
[51] Int. Cl.²........................................... H04B 3/46
[58] Field of Search............ 179/175.3 R, 175.31 R, 179/2 A; 340/163, 146.1 C, 146.1 D

[56] References Cited
UNITED STATES PATENTS

| | | | |
|---|---|---|---|
| 3,159,812 | 12/1964 | Engel............................. | 340/146.1 D |
| 3,371,165 | 2/1968 | Earle et al..................... | 179/175.3 R |
| 3,384,873 | 5/1968 | Sharma......................... | 340/146.1 C |
| 3,790,723 | 2/1974 | Stewart......................... | 179/175.3 R |
| 3,814,839 | 6/1974 | Lubarsky et al. ............. | 179/175.3 R |
| 3,843,848 | 10/1974 | Cox............................... | 179/175.3 R |

OTHER PUBLICATIONS

U.S. Published Patent Application, B 411,633, Bonser et al., 1-28-75.

*Primary Examiner*—Douglas W. Olms
*Attorney, Agent, or Firm*—Neil B. Schulte

[57] ABSTRACT

Telephone line testing equipment in which a series of alternating current tone pulses are transmitted from the central office along the lines to a sensing means placed at a remote point in the circuit. The sensing means receives the coded tone pulse sequence, decodes it to determine if the address is correct, and if so, what information is present, and then either connects or disconnects the remote equipment from the line or, in the alternative, connects suitable loopback testing circuits to the line.

8 Claims, 2 Drawing Figures

TELEPHONE LINE CONTROL SYSTEM

BACKGROUND OF THE INVENTION

This invention relates to an improvement in telephone line testing equipment of the type described in U.S. Pat. No. 3,843,848. Other improvements to this patent were applied for in two pending patent applications titled "Telephone Line Testing Equipment" filed on Sept. 14, 1973 by Russell G. Cox et al., Ser. No. 397,268 now abandoned and "Coded Telephone Line Testing Equipment" filed on Jan. 14, 1974 by Brian B. Brady, Ser. No. 432,806. The subject matter of these applications and the patent relates to a highly effective method of remotely testing telephone lines by passing alternating current signals down the line from a central office and detecting the alternating current at a remote point in the circuit with a suitable pickup. The sensed AC signal is used to operate a switch so as to connect the telephone lines together to form a loopback circuit through which the lines up to that remote point may be tested. The subject matter of these patent applications and the patent are herein incorporated by reference. Although these prior inventions work well there exist additional requirements which can be more suitably satisfied by the invention proposed herein.

The last mentioned patent application relating to coded telephone line testing equipment teaches a system wherein a series of coded tone bursts are transmitted down the line and decoded at the remote end to determine if the particular remote unit in question is the one being addressed. If a match is made, a loopback circuit is completed for that piece of equipment only and the rest of the circuit is not affected. This is very useful in four-wire telephone systems wherein it is common to connect a plurality of different sets of equipment to a single circuit. With the use of this prior invention it is possible to loopback only one particular piece of equipment. In addition, it provides a greater degree of security from the noisy environment normally associated with computers and other modems that may be connected to the telephone line. However, the subject matter of the aforementioned patent application turns out to be somewhat more expensive and more complex than the present invention because it uses a clock signal generated at the transmitting station which is transmitted down the line to the remote unit. The clock signal is used by the remote unit to help compare the incoming code signal with the stored code to determine whether or not the loopback signal is intended for that particular remote unit. The present invention avoids this extra complication as described hereinafter.

BRIEF SUMMARY OF THE INVENTION

Briefly, my invention utilizes circuits in the remote unit which create their own clock signal. Thus, it becomes unnecessary to transmit clock information down the line and instead only address code information need be transmitted. The present invention has the additional advantage of being able to transmit special instruction information along with the address code so that a greater number of functions can be performed at the remote unit. The present invention not only can complete a loopback circuit but it also can isolate the customer equipment from the line completely or in the alternative restore the customer equipment to the line upon a predetermined signal being transmitted. Consequently, the circuits of the present invention provide not only a less expensive and less complex system but also provide additional remote control functions not heretofore disclosed in the aforementioned patent or patent applications. It may therefore be seen that it is an object of this invention to provide an improved telephone circuit testing system having increased flexibility and lower cost. Further objects and advantages will become apparent from the following detailed description and drawings.

DESCRIPTION OF THE PREFERRED EMBODIMENT

Figure 1:
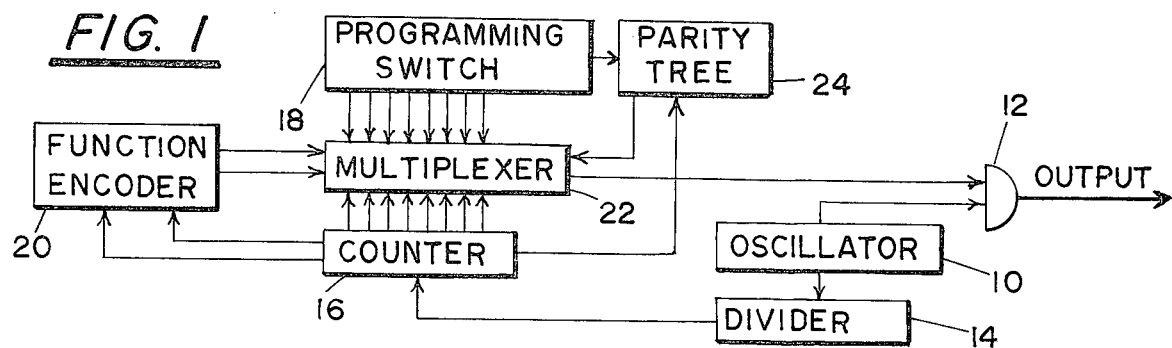
FIG. 1 is a schematic circuit diagram showing the central office circuit which generates a series of coded pulses to operate the loopback and isolation switches at the remote end.

In FIG. 1 a schematic diagram of the central office pulse generator is shown. A series of AC tone bursts of a frequency of 2713 hertz are gated out from an oscillator 10 by means of a gate 12. Gate 12 is controlled by a multiplexer 22 in a manner well known to those skilled in the art. Multiplexer 22 is advanced and operated by a counter 16 which in turn is advanced by pulses from a divider 14 operating off of oscillator 10. As multiplexer 22 is advanced by counter 16 through eight counts, gate 12 is opened each time in accordance with whether or not a "one" is presented by a programming switch 18. Codes are always chosen such that the first pulse will be a "one" so as to insure the initiation of reception at the remote end. The total parity of programming switch 18 is determined by a parity tree 24. Counter 16 operates parity tree 24 on the ninth count so that the ninth bit transmitted by multiplexer 22 represents a parity check. Upon completion of this series of coded pulses the address and its parity check will have been transmitted to the remote station. Counter 16 now continues on to operate a function encoder 20 so that the next two bits represent an instruction to the remote unit on whether to operate a loopback switch, an isolation switch, or both.

Figure 2:
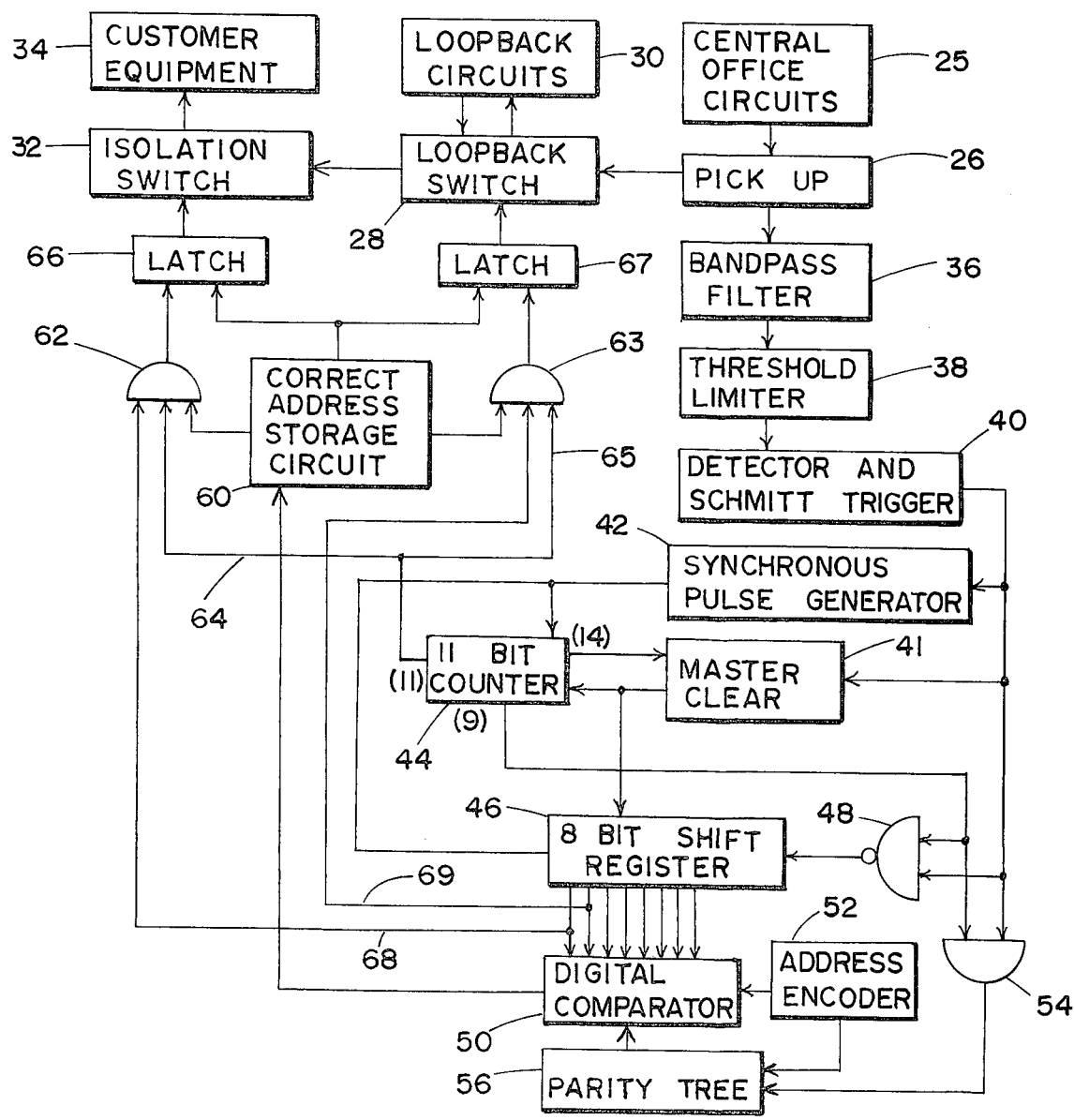
FIG. 2 is a schematic circuit diagram showing the receiving circuits positioned before each set of customer equipment for determining if the sequence of pulses is addressed to that location and completing the loopback or the isolation as may be commanded.

In FIG. 2 a schematic diagram of the remote unit is presented. The circuits of FIG. 1 are grouped together and referred to as central office circuits 25. The incoming signals from the central office circuits 25 pass through a suitable pickup 26 which may comprise, for example, an inductive pickup of the type described in the above referenced patent. The telephone line is then connected to the customer equipment 34 through a loopback switch 28 so that a suitable loopback through loopback circuits 30 may be accomplished if that is the coded instruction received. The line is also connected through an isolation switch 32 to customer equipment 34. The AC tone pulses detected by pickup 26 are transmitted through a bandpass filter 36 which is designed to pass only the 2713 hertz frequency and help screen out the background noise. The AC tone bursts from filter 36 are presented to a threshold limiter 38 whose output characteristic is such that the output is of a constant amplitude and duration regardless of the input voltage above its threshold. Accordingly, each of the tone pulses is improved in shape and presented to a detector and Schmitt trigger 40. Detector 40 converts each pulse into a uniform square wave while the Schmitt trigger circuit is adjusted so that no input signals of a duration of less than 30 milliseconds may be detected. The output from detector 40 then represents a series of pulses representing ones or lack of pulses representing zeros in a coded sequence which may or may not match the address of the particular receiving circuit. The first pulse received, which is always a one, causes a master clear circuit 41 to activate so as to clear an 8 bit shift register 46 and an 11 bit counter 44 to their start conditions. The master clear circuit 41 is of the type which latches on the first pulse only and therefore does not respond to subsequent pulses. The first pulse also starts a synchronous pulse generator 42 which drives the eleven bit counter 44 and the eight bit shift register 46. The pulse code sequence itself passes through a NAND gate 48 to shift register 46 so that the code may be compared by a digital comparator 50 with the predetermined address stored in address encoder 52. On the ninth bit, which is received after the address code is completed, counter 44 inhibits gate 48 so as to prevent the entry of the ninth bit into shift register 46. At the same time the ninth count output from counter 44 activates a gate 54 to allow the pulse or lack thereof from detector 40 to be compared by the parity tree 56. Parity tree 56 compares this parity bit with the known parity from address encoder 52 and, if a match is present, signals digital comparator 50 to store the fact that a correct address has been received in storage circuit 60. Storage circuit 60 then enables a pair of gates 62 and 63 and unlatches a pair of latches 66 and 67 so that the remote unit is now prepared to accept any instructions following the address code. The instructions may be transmitted, for example, on the tenth and eleventh pulses and, accordingly, counter 44 on the eleventh pulse opens gates 62 and 63 by means of connections 64 and 65.

Since gate 48 is only inhibited on the ninth pulse the tenth and eleventh pulses are free to pass through to shift register 46 and therefore whatever instruction code is transmitted may be picked up on lines 68 and 69 and presented to gates 62 and 63. Gate 62 is connected to operate latch 66 so as to hold open the isolation switch 32. Thus, if a pulse is received on line 68, isolation switch 32 is activated to remove the customer equipment 34 from the line. If gate 63 receives a pulse on line 69 it operates a latch 67 which operates the loopback switch 28, in the manner described in the above referenced applications and patent, to establish loopback circuit 30. If a one-one code signal is received, both gates 62 and 63 are opened which results in the customer equipment being disconnected and the line terminated in a loopback circuit.

Both the isolation switch 32 and the loopback switch 28 may be deactivated by sending the correct address code so as to unlatch latches 66 and 67 with no instruction pulses on the tenth and eleventh counts. This, of course, corresponds to a zero-zero instruction code.

At the completion of the instructions the counter 44 may be used to reset master clear 41 in order to make the circuit ready to receive the next address code. This is shown by a connection from counter 44 to master clear 41 which activates on the fourteenth count to unlatch master clear 41 so that it may reset counter 44 and register 46 to the start position when the next pulse is received.

Clearly a number of possible modifications could be made to this invention. For example, additional functions could be remotely controlled through the use of additional gates and latches. Since shift register 46 is used twice it has a large capacity for additional instruction codes. Accordingly, the invention should not be limited except in accordance with the following claims.

I claim:

1. Apparatus for the testing of a communication circuit from one point to another remote point comprising in combination;

means for applying a binary coded series of pulses to the circuit, said coded series including an address code which always begins with one initial pulse;

sensing means in the circuit at the remote point for sensing said coded series of pulses;

comparing means connected to said sensing means for receiving said series of pulses and comparing the address code therein as it is received with a stored address code which is automatically generated at the remote point to determine if the proper address code has been received;

stored address code generating means connected to said comparing means to provide said address code in response to said initial pulse;

first switching means connected to said comparing means operable upon the reception of the proper address code to connect a loopback circuit to said communication circuit in response to the reception of the proper loopback instruction in the coded series of pulses; and second switching means connected to said comparing means operable upon the reception of the correct address code to control an isolation switch in response to the reception of the appropriate instruction in the coded series of pulses.

2. The apparatus of claim 1 including a correct address storage means connected to the comparing means and the switching means so as to activate the switching means if the proper address code is detected by the comparing means.

3. The apparatus of claim 2 in which said means for applying comprises a gating means adapted to gate out a series of AC pulses, said gating means controlled by a programming switch and a function encoder.

4. The apparatus of claim 3 including a counting means connected to advance the gating means so as to gate out first the address code from the programming switch and then the instruction code from the function encoder.

5. The apparatus of claim 2 in which said comparing means comprises a shift register and a digital comparator connected to an address encoder, said shift register being advanced by a synchronous pulse generator which is started by the first pulse in the code.

6. The apparatus of claim 5 in which said first and second switching means are controlled by code pulses received from said shift register through gates and latches controlled by said correct address storage means which storage means is controlled by said digital comparator.

7. The apparatus of claim 4 in which said pulses each comprise an alternating current tone signal.

8. The apparatus of claim 6 in which said pulses each comprise an alternating current tone signal.

\* \* \* \* \*